(12) United States Patent
Bian et al.

(10) Patent No.: US 10,432,869 B2
(45) Date of Patent: Oct. 1, 2019

(54) METHOD OF UTILIZING WIDE-ANGLE IMAGE CAPTURING ELEMENT AND LONG-FOCUS IMAGE CAPTURING ELEMENT FOR ACHIEVING CLEAR AND PRECISE OPTICAL ZOOMING MECHANISM

(71) Applicant: MULTIMEDIA IMAGE SOLUTION LIMITED, Dublin (IE)

(72) Inventors: Qiaoling Bian, Hangzhou (CN); Yanqing Lu, Hangzhou (CN); Jin Wang, Hangzhou (CN)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 154 days.

(21) Appl. No.: 15/257,949

(22) Filed: Sep. 7, 2016

(65) Prior Publication Data
US 2018/0070018 A1    Mar. 8, 2018

(51) Int. Cl.
*H04N 5/232* (2006.01)
*H04N 5/225* (2006.01)
*G06T 7/00* (2017.01)
*H04N 9/73* (2006.01)
*H04N 5/247* (2006.01)
*H04N 5/262* (2006.01)

(52) U.S. Cl.
CPC ....... *H04N 5/23296* (2013.01); *H04N 5/2258* (2013.01); *H04N 5/23238* (2013.01); *H04N 5/247* (2013.01); *H04N 5/262* (2013.01); *H04N 9/735* (2013.01)

(58) Field of Classification Search
CPC ............... H04N 5/23296; H04N 5/145; H04N 5/23238; H04N 9/735; H04N 5/265

USPC .......................................................... 348/36
See application file for complete search history.

(56) References Cited

U.S. PATENT DOCUMENTS

| 9,247,129 | B1* | 1/2016 | Gray | G06T 7/11 |
| 2010/0272311 | A1* | 10/2010 | Nir | G06T 7/269 |
| | | | | 382/100 |
| 2015/0365605 | A1* | 12/2015 | Griffith | H04N 5/2251 |
| | | | | 348/240.2 |
| 2016/0028949 | A1* | 1/2016 | Lee | H04N 5/06 |
| | | | | 348/218.1 |
| 2016/0381289 | A1* | 12/2016 | Kim | H04N 5/23222 |
| | | | | 348/38 |
| 2017/0230585 | A1* | 8/2017 | Nash | H04N 5/23241 |

* cited by examiner

*Primary Examiner* — Susan E. Hodges
(74) *Attorney, Agent, or Firm* — Bacon & Thomas, PLLC

(57) ABSTRACT

The present invention is to provide a method for achieving a clear and precise optical zooming mechanism, which is applied to an electronic device equipped with a wide-angle image capturing element and a long-focus image capturing element. The wide-angle image capturing element and the long-focus image capturing element are controlled by the electronic device for capturing a wide-angle image and a long-focus image of a same spot simultaneously and respectively. The method enables the electronic device to sequentially perform an exposure and white balance adjustment process, a robust image matching algorithm and an image morphing fusion process to the wide-angle image and the long-focus image, respectively, so as to generate a clear and precise optical zooming image of the spot without having a significant skipping phenomenon occurred in an object within two zooming images.

6 Claims, 8 Drawing Sheets

METHOD OF UTILIZING WIDE-ANGLE IMAGE CAPTURING ELEMENT AND LONG-FOCUS IMAGE CAPTURING ELEMENT FOR ACHIEVING CLEAR AND PRECISE OPTICAL ZOOMING MECHANISM

FIELD OF THE INVENTION

The present invention relates to an image processing method, more particularly to a method of utilizing a wide-angle image capturing element and a long-focus image capturing element for achieving a clear and precise optical zooming mechanism, which is applied to an electronic device equipped with the wide-angle image capturing element and the long-focus image capturing element, such that the electronic device is able to control the wide-angle image capturing element and the long-focus image capturing element to capture a wide-angle image and a long-focus image of a same spot simultaneously and respectively, and then to generate a new long-focus image after sequentially performing an exposure and white balance adjustment process, a robust image matching algorithm and an image morphing fusion process to the wide-angle image and the long-focus image, respectively, so as to display a clear optical zooming image of the spot without having a significant skipping phenomenon occurred in an object within two adjacent zooming images during the zooming procedure.

BACKGROUND OF THE INVENTION

In recent years, due to the rapid development of electronic technology, the camera features of the smartphones are also becoming very powerful. In order to create differentiations between the smartphones in the markets, the major manufacturers of the smartphones have devoted all their efforts and intelligences in improving the specifications and functions of the cameras on their smartphones, such as enhancing the image pixels, strengthening the selfie function, increasing the aperture, enhancing the optical anti-shake (OIS) function, accelerating the focusing speed and supporting the professional manual mode . . . , etc. Although, the specifications and functions of the cameras on all kinds of smartphones have already be improved a lot than they were used to be, however, the designs of so-called "dual-lenses" are still being deemed as a mainstream of hardware development needed to be implemented to the cameras of the smartphones by most major manufacturers.

Why do most of the major manufacturers want to develop the "dual-lenses" designs onto the cameras of the smartphones? What would be the features and functions that the "dual-lenses" designs can provide to the smartphones? Please review the situations and needs of the smartphones in current market as follows:

(1) Image capturing limitation of a single-lens: In recent years, the features of pixels, precisions, lens qualities and post-algorithms . . . evolving in the image sensor chips (e.g., CMOS) of the smartphone cameras are increasingly powerful and are gradually reaching to a level threatening the market of professional SLR cameras. However, the slim and light designing trends of the smartphones also cause each of the cameras equipped therewith only capable of utilizing a smaller sized image capturing element (which is an integration of a lens and an image sensor made of wafer) therein due to the size restriction and limited hardware structure of the smartphone. Thus, almost every image capturing element installed in a smartphone adopts a single lens having large aperture and wide angle design, but without having the ability to provide an optical zooming function. In general, the original design function of the camera on the ordinary smartphone is mostly for capturing images of people and near objects under the indoor and low light environments, because the design of large aperture can produce shallow depth of field as well as obtaining better imaging results, but also prone to the problem of insufficient depth of field, in particular, it is easy to cause background or foreground out of a fixedly focused object to be blurred. Therefore, when using the current smartphone camera to capture an image of a magnificent landscape scene, the image being captured will become loose and not sharp enough, and it will also not be easy to capture clear time effect of the image (such as the image of flowing water, car moving track or light graffiti . . . , etc.) and, under sunny and light enough environments, the image being captured is often prone to overexposure problems.

(2) The needs of "dual-lenses" or "multi-lenses": In recent years, various types of 3D or panoramic films have been broadcasted world-widely in the film market, and are very popular to lots of consumers who are in turn eager to produce 3D or panoramic videos through using their owned smartphones. In response, many of the smartphone manufacturers are dedicating themselves to the research and development relating to the applications of 3D or panoramic cameras, and have launched whole new designed smartphones having the functions of capturing 3D or panoramic videos, such as 360-degree virtual reality (VR) real-time video streaming, the remote end of augmented reality (AR), ultra-high-quality live video broadcast, etc. Since each of the image capturing applications have to be supported by at least two different special lenses, the "dual-lenses" or "multi-lenses" designs are thus becoming to be a requisite accessory on a new generation of smartphones.

(3) Dual-lenses technology unable to achieve a clear and precise optical zooming mechanism: For instance, in 2014, HTC Corporation launched an "One M8" type smartphone having a function of providing the world's first dual depths of field while capturing images, of which the "dual-lenses" technology is built-in with an "Ultra-Pixel with Duo Camera" developed and designed by Altek Corporation, and the "Duo Camera" has a primary lens and a secondary lens installed at the rear surface of the smartphone and capable of working together for capturing images, wherein the primary lens is large than the secondary lens and responsible for capturing the image, and the secondary lens is responsible for recording depth information of the environment, so that a user is able to change the focus position of the image through operating user interface of the smartphone after capturing the image. In November 2015, LG Corporation launched a "V10" type smartphone, which is built-in with an image sensor having 5 million pixels along with a 80-degree normal lens and another image sensor having 5 million pixels along with a 120-degree ultra-wide-angle lens, wherein the dual front lenses design can be chosen to be operated in a standard-angle field of view or a wide-angle field of view at the time of selfie, the 120-degree wide-angle lens can capture the image of the entire background (even the image of a group of people) during selfie, and the 80-degree normal lens can capture the close-up image during selfie. In 2016, LG Corporation released a "G5" type smartphone, of which the dual-lenses design is built-in on the rear surface of the smartphone with an image sensor having 16 million pixels along with a 78-degree normal lens and another image sensor having 8 million pixels along with a 135-degree ultra-wide-angle lens, wherein the 135-degree ultra-wide-angle lens is able to provide a view angle 1.7 times wider (even 15 degrees wider than the view angle of naked eye) than that of the other smartphone in the market, so that a user can use the smartphone to easily capture more image of a scene without having to keep a long distance with the scene. In addition, many science and technology media also predicted that Apple Corporation may release an "iPhone7" in 2016 built-in with dual-lenses design, which may include two image capturing elements having different focal lengths respectively, so as to enable the "iPhone7" to be switched and operated in a standard mode or a remote scene mode for capturing images. However, in view of the above, none of the aforementioned dual-lenses designs is able to achieve clear and precise optical zooming mechanism on behalves of the smartphones.

Why none of the dual-lenses designs implemented in the aforementioned smartphones is able to achieve a clear and precise optical zooming mechanism? The primary reason is that all the aforementioned smartphones are built-in with a standard lens and a wide-angle lens having a large aperture, which will inevitably cause the following problems during the zooming procedure:

(1) Causing image of an object being fixedly focused from a long distance to be blurred: Please refer to FIG. 1, because the standard lens and the wide-angle lens are unable to precisely and fixedly focus on the object 10 (such as the mineral water bottle shown in FIG. 1) from a long distance, so that it will be easy to produce blurred image 11 on the object 10 (such as the blurred text image on the mineral water bottle shown in the right bottom corner of FIG. 1) while the object 10 being zoomed in.

(2) Causing the object 10 within in the images captured in the zooming procedure to abnormally skip between the images: Please refer to FIG. 2, because the corresponding hardware parameters between the standard lens and the wide-angle lens must exist some differences, such as the differences between fields of view (hereinafter referred to as FOV), picture angles . . . and sizes of the corresponding image sensor chips (e.g., CMOS), which inevitably cause the images respectively captured by the standard lens and the wide-angle lens to be different in image ratio, and then cause the corresponding pixels on the images respectively captured by the standard lens and the wide-angle lens to be shifted and have offsets therebetween during the zooming procedure, such as zooming in the object from a zoom ratio of 1.79 (as shown in FIG. 2(a)) to a zoom ratio of 1.80 (as shown in FIG. 2(b)), whereby the object obviously and abnormally skips within the two images (such as causing an obvious and abnormal transition skip from x1 to x2 as shown in FIGS. 2(a) and 2(b), respectively).

In view of the above-mentioned developing evolutions and history of the current dual-lenses smartphones, although the dual-lenses design applications in the current smartphones are quite diverse and differences, such as for enhancing the 3D performance, pulling up the depth of field, tracking face, providing ultra-wide angle, adding pixels, providing multi-apertures . . . and so on, but if the dual-lenses are merely designed to compensate for the lack of a single large aperture wide-angle lens design and do not provide an accurate and clear optical zooming mechanism, it will be very difficult to let the cameras of the smartphones reach to a new level comparable to a professional DSLR camera having the optical zooming function. Accordingly, it is an important issue of the present invention for designing a dual-lenses module capable of achieving a precise and clear optical zooming mechanism so that, when using a smartphone to fixedly focus on and zoom in an object from a long distance, not only a clear zoom-in image of the object can be obtained, but also the object within the images captured during the zooming procedure will not significantly skip between the images, so as to let the smartphone have an excellent optical zooming mechanism.

SUMMARY OF THE INVENTION

The primary objective of the present invention is to provide a method of utilizing a wide-angle image capturing element and a long-focus image capturing element for achieving a clear and precise optical zooming mechanism, which is applied to an electronic device (such as smartphone, digital camera or tablet . . . , etc.), wherein the electronic device is equipped with a wide-angle image capturing element and a long-focus image capturing element, and the wide-angle image capturing element and the long-focus image capturing element are controlled by the electronic device for capturing a wide-angle image and a long-focus image of a same spot simultaneously and respectively. After obtaining the wide-angle image and the long-focus image, the electronic device is able to perform an exposure and white balance adjustment process to the wide-angle image and the long-focus image respectively, so as to enable the exposure and the white balance of the wide-angle image and the long-focus image to be in consistency; then, to perform a robust image matching algorithm to the wide-angle image and the long-focus image respectively, so as to enable each pixel on the long-focus image to match with each corresponding pixel on the wide-angle image; and finally, according to dense optical flow field of an offset of each pixel on the long-focus image with respect to each corresponding pixel on the wide-angle image obtained through using an optical flow estimation, to perform an offset deformation to the pixels on the long-focus image, so as to enable the pixels on the long-focus image to be deformed to match with the corresponding pixels on the wide-angle image, and then to perform a fusion process to the long-focus image and the wide-angle image, so as to generate a new wide-angle image.

Thus, when the electronic device of the present invention is fixedly focusing on and zooming in an object from a long distance, it will easily obtain precise and clear images of the object during the zooming procedure, and the object within the images captured during the zooming procedure will not significantly skip between the images, so as to let the smartphone of the present invention have an excellent optical zooming mechanism comparable to that of a professional DSLR camera.

BRIEF DESCRIPTION OF THE DRAWINGS

The above and other objectives, as well as the technical features and effects, of the present invention can be better understood by referring to the following detailed description in conjunction with the accompanying drawings, in which.

DETAILED DESCRIPTION OF THE PREFERRED EMBODIMENTS

As mobile electronic devices (e.g., smart phones, digital cameras, or tablets . . . , etc.) have more comprehensive features and become more popular in every where of the world, people are no longer satisfied with a simple image capturing function while using each of the electronic devices for capturing images or action videos, and in turn hope that the image capturing process and quality of each mobile electronic device can be comparable to the advanced and professional SLR camera, such as having the ability of clearly and precisely capturing an image from a long distance. However, due to the slim and compact size trend while designing the currently available mobile electronic devices, the single lens or the aforementioned dual-lenses equipped on these mobile electronic devices are merely able to capture images of objects from a long distance through digital zooming, thus, when zooming in the image to a certain distance, the pixels on the image will inevitably become blurred and are unable to be comparable to those captured by professional SLR cameras through their excellent optical zooming mechanisms.

Figure 1:
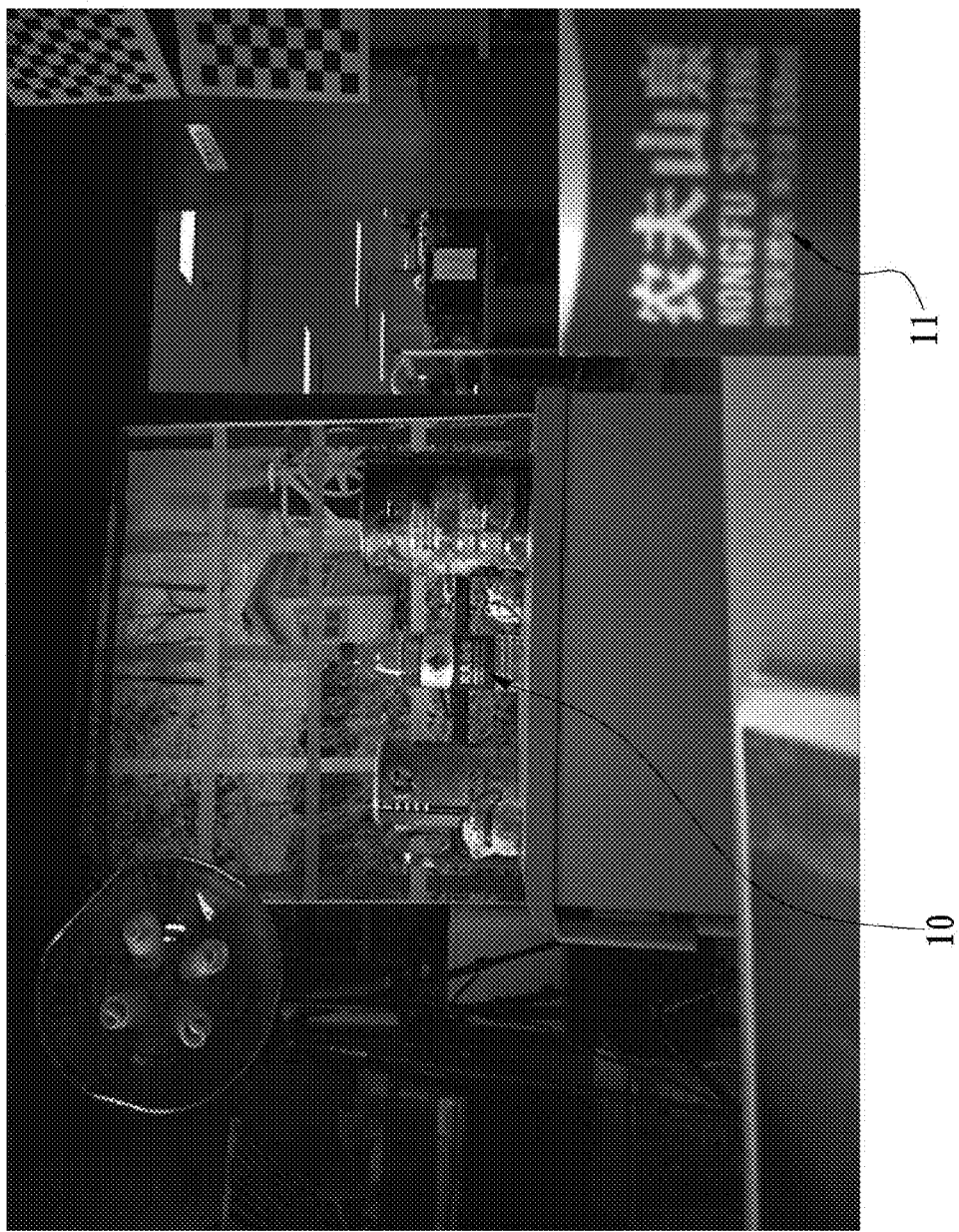
FIG. 1 is an image captured through a digital zooming by a single lens or dual-lenses camera of a conventional smartphone.
Figure 2A:
FIGS. 2(a) and 2(b) are images captured through a digital zooming by a single lens or dual-lenses camera of a conventional smartphone, wherein the object within the images obviously and abnormally skips between the images.
Figure 2B:
Figure 3:
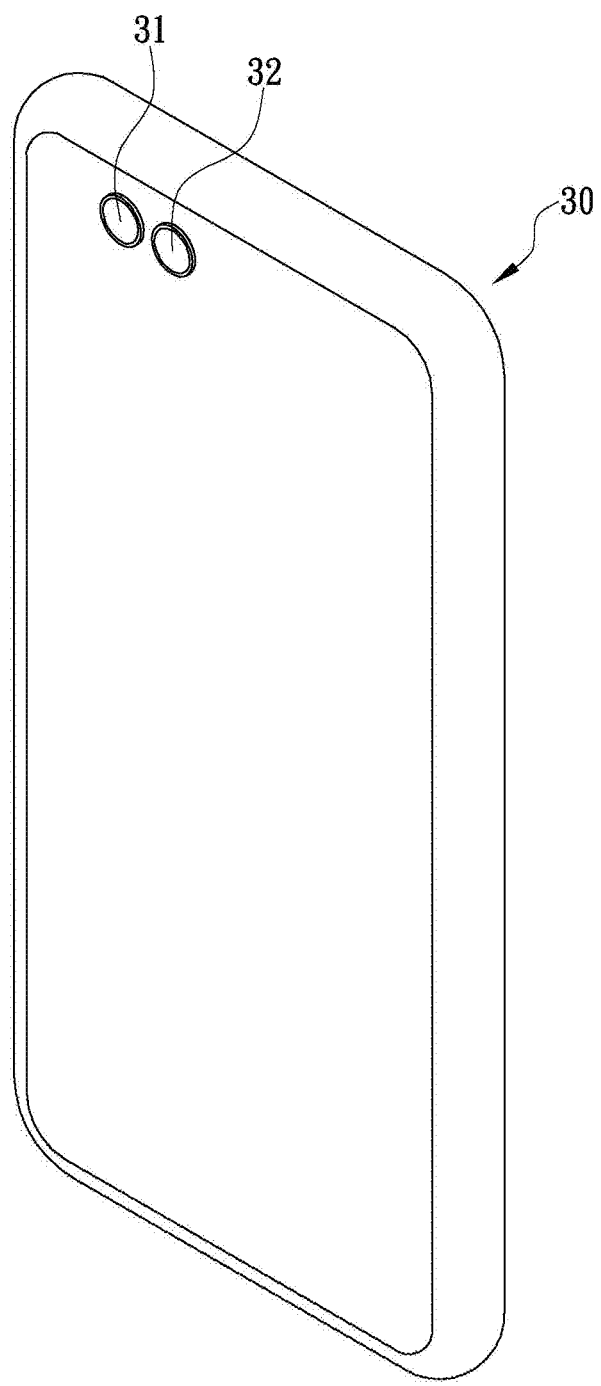
FIG. 3 is a schematic view of the electronic device of the present invention.
Figure 4:
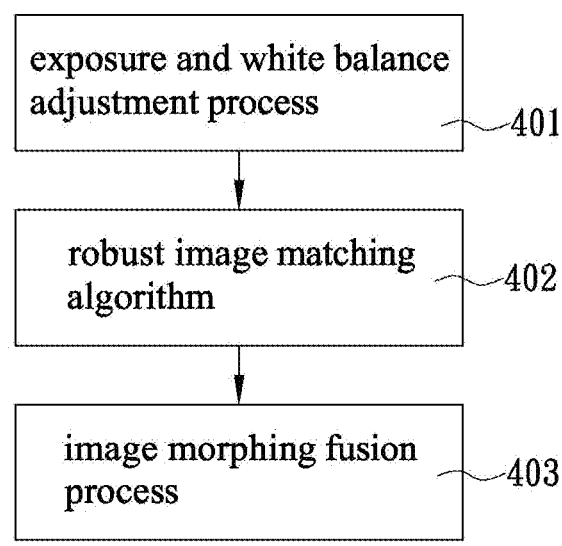
FIG. 4 is a flowchart of the present invention.

In view of this, after many years of research, experiments and continuous improvement, the inventor of the present invention is thinking of utilizing a wide-angle image capturing element and a long-focus imaging capturing element to enable a mobile electronic device to easily achieve an accurate and clear optical zooming mechanism. The present invention is to provide a method of utilizing a wide-angle image capturing element and a long-focus image capturing element for achieving a clear and precise optical zooming mechanism, which is applied to an electronic device (such as smartphone, digital camera or tablet . . . etc.). Please refer to FIG. 3, the electronic device 30 is equipped with a wide-angle image capturing element 31 and a long-focus image capturing element 32, wherein both of the image capturing elements 31, 32 are installed at two adjacent positions on the front or back surface of the electronic device 30, the wide-angle image capturing element 31 is composed of a wide-angle lens and a first image sensor chip (e.g., CMOS), the long-focus image capturing element 32 is composed of a long-focus lens and a second image sensor chip (e.g., CMOS), a focal length of the wide-angle lens is less than 50 cm focal length of a standard lens, a focal length of the long-focus lens is greater than the focal length of the standard lens, and the wide-angle image capturing element 31 and the long-focus image capturing element 32 are controlled by the electronic device 30 for capturing a wide-angle image and a long-focus image of a same spot simultaneously and respectively. The method of the present invention enables the electronic device 30 to perform the following steps, as referring to FIG. 4 for achieving a clear and precise optical zooming mechanism:

(401) reading the wide-angle image W(x, y) and the long-focus image T(x+u, y+v), respectively, and performing an exposure and white balance adjustment process to the wide-angle image W(x, y) and the long-focus image T(x+u, y+v), respectively, so as to enable the exposure and the white balance of the wide-angle image and the long-focus image to be in consistency; though, the wide-angle image capturing element 31 and the long-focus image capturing element 32 can simultaneously and respectively capture the wide-angle image W(x, y) and the long-focus image T(x+u, y+v) of the same spot, however, because the wide-angle image capturing element 31 and the long-focus image capturing element 32 are not installed at the same position on the electronic device 30, but at two different adjacent positions on the electronic device 30, which eventually causes the exposures and the white balances between the wide-angle image W(x, y) and the long-focus image T(x+u, y+v) existing some differences due to the image capturing angles thereof and ought to be resolved by the exposure and white balance adjustment processes. In the meantime, due to differences of the hardware parameters between the wide-angle image capturing element 31 and the long-focus image capturing element 32, there will also be some offsets (u, v) in the positions corresponding to the pixels (x, y) on the wide-angle image and the long-focus image.

Figure 5:
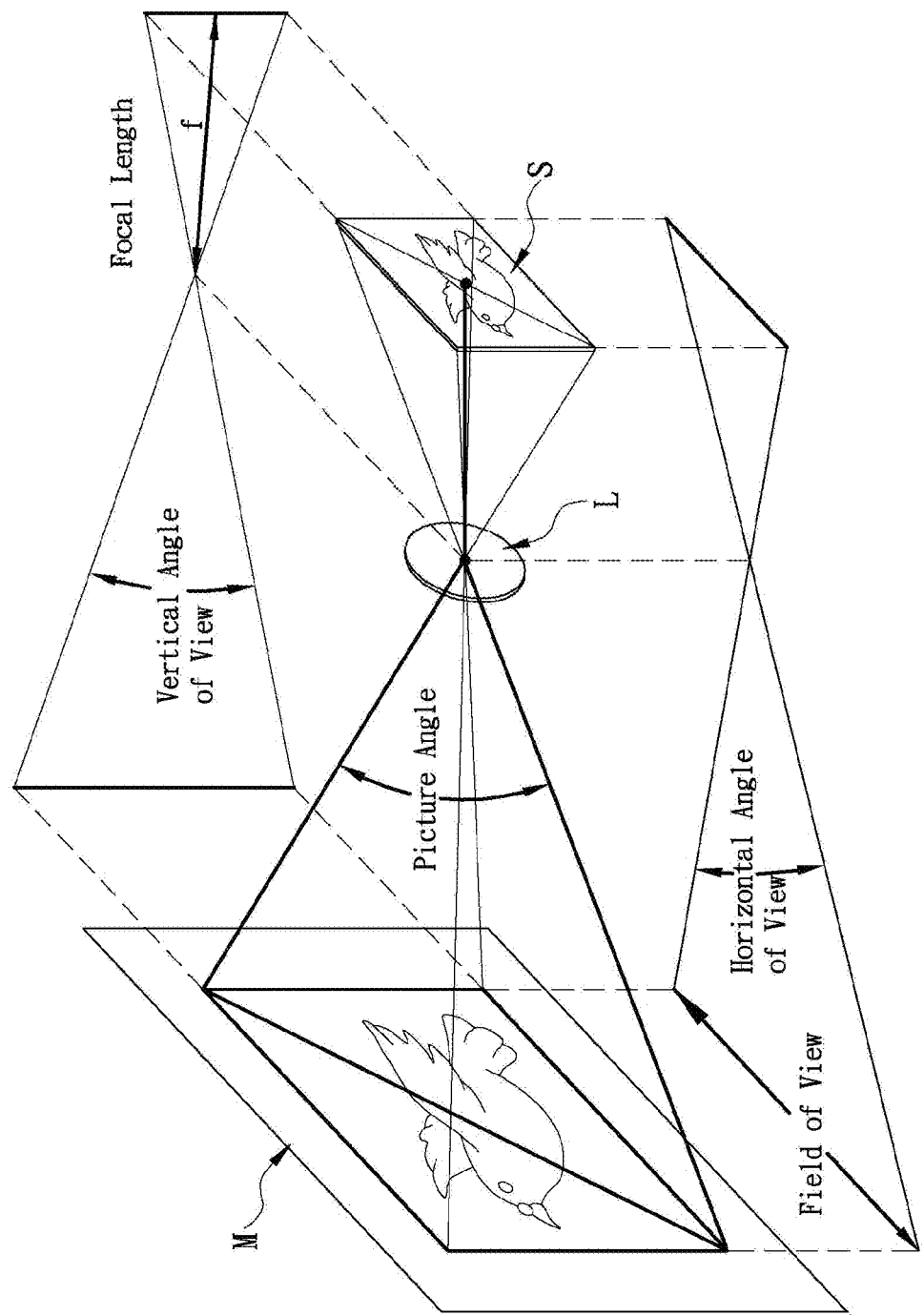
FIG. 5 is a schematic view of hardware parameters of the image capturing element.

(402) performing a robust image matching algorithm to the wide-angle image W(x, y) and the long-focus image T(x+u, y+v), respectively, so as to enable each pixel on the long-focus image T(x+u, y+v) to match with each corresponding pixel on the wide-angle image W(x, y), wherein the robust image matching algorithm calculates an image ratio between the wide-angle image W(x, y) and the long-focus image T(x+u, y+v) of the same spot M respectively being captured by the wide-angle image capturing element 31 and the long-focus image capturing element 32 according to the hardware parameters thereof, please refer to FIG. 5, such as FOV, picture angle, vertical angle of view, horizontal angle of view, . . . and other parameters, etc., of the lens L (i.e., the wide-angle lens or the long-focus lens) as well as the size of the image sensor chip S (i.e., the first image sensor chip or the second image sensor chip), then retrieves a region (hereinafter referred to as "corresponding wide-angle image W(x, y)") from the wide-angle image W(x, y) that corresponds to the long-focus image T(x+u, y+v) according to the image ratio, and calculates and obtains dense optical flow field of an offset of each pixel on the long-focus image T(x+u, y+v) with respect to each pixel on the corresponding wide-angle image W(x, y) by using an optical flow estimation based on the following formula of a Horn-Schunck optical flow estimation model (which is an algorithm currently more mature and versatile than the others and well known in the art, but doesn't constitute a limitation while the present invention is applied in practice), so as to convert the optical flow estimation into an optimization process for obtaining the dense optical flow field and then perform the robust image matching algorithm to the corresponding wide-angle image W(x, y) and the long-focus image T(x+u, y+v) accordingly for enabling the corresponding pixels on the corresponding wide-angle image W(x, y) and the long-focus image T(x+u, y+v) to match with each other:

$$\min E(u,v) = \int_\Omega [(\varphi(W(x,y) - T(x+u, y+v)) + \alpha^* \psi(|\nabla u|, |\nabla v|))] dx dy,$$

wherein $\varphi(W(x, y) - T(x+u, y+v))$ is a data item representing the gray value conservation constraint for enabling each corresponding pixels on the corresponding wide-angle image W(x, y) and the long-focus images T(x+u, y+v) to be the same as far as possible, φ is an error function; α*ψ(|∇u|, |∇v|): is a smooth item representing the optical flow smoothness constraint, that is because only the data item is insufficient to complete the dense matching, especially when those pixels on the corresponding wide-angle image W(x, y) and the long-focus image T(x+u, y+v) are in solid colors, it is unable to find out the exact offsets therebetween simply by using the data item, therefore, it is necessary to join the smooth item into the above-mentioned formula for enabling the offset between every two adjacent pixels on the corresponding wide-angle image W(x, y) and the long-focus image T(x+u, y+v) not to be much different, that also means that the change rate of the offsets is not too large; a is a weight factor for controlling the weight between the data item and the smooth item, so as to improve the accuracy of the optical flow estimation in diverse and complex scene, and its value is set according to an experiential value and can also be dynamically changed according to the actual needs; ψ is also an error function; according to different needs, φ and ψ can be absolute value function, quadratic function, or non-negative symmetrical and positive axle monotonically increasing function . . . , etc.; in the following embodiment of the present invention, in order for calculation convenience, φ and ψ are taken as a quadratic function in order to facilitate solving extreme value, but that won't a limitation of the present invention when applied in practice; ∇u and ∇v are modulus lengths of the offset gradients; in addition, the afore-mentioned optical flow estimation is executed under the following presumptions:

(1) brightness differences between the corresponding pixels on the long-focus image T(x+u, y+v) and the corresponding wide-angle image W(x, y) are constant;

(2) motion differences between the corresponding pixels on the long-focus image T(x+u, y+v) and the corresponding wide-angle image W(x, y) are small;

(3) motion vectors of the corresponding pixels on the long-focus image T(x+u, y+v) and the corresponding wide-angle image W(x, y) are the same.

Due to the corresponding wide-angle image W(x, y) and the long-focus image T(x+u, y+v) are captured by the electronic device 30 with respect to the same spot at the same time, the above-mentioned presumptions should be easily achieved. Thus, after completing the robust image matching algorithm with respect to the corresponding wide-angle image W(x, y) and the long-focus image T(x+u, y+v), respectively, the dense optical flow field of an offset of each pixel on the long-focus image T(x+u, y+v) can easily be obtained through the above-mentioned formula based on the Horn-Schunck optical flow estimation model;

(403) performing an image morphing fusion process, which is used to enable the pixels on the long-focus image T(x+u, y+v) to be deformed to match with the corresponding pixels on the corresponding wide-angle image W(x, y) according to the dense optical flow field of the offset of each pixel on the long-focus image T(x+u, y+v) obtained through the robust image matching algorithm. Thus, the deformed long-focus image T(x+u, y+v) and the corresponding wide-angle image W(x, y) can be merged together through the following formula along with a weight factor λ, for generating a new wide-angle image $W_{NEW}$:

$$W_{NEW}=(1-\lambda)T(x+u,y+v)+\lambda*W(x,y),$$

wherein the weight factor λ is determined according to actual needs such as, when it is determined that the pixels on the deformed long-focus image T(x+u, y+v) are clearer than the corresponding pixels on the corresponding wide-angle image W(x, y), taking λ=0, otherwise, taking 0<λ<1.0. Thus, when the pixels on the deformed long-focus image T(x+u, y+v) can match with the corresponding pixels on the corresponding wide-angle image W(x, y), it will be easy to complete the image morphing fusion process simply through directly replacing the corresponding pixels on the corresponding wide-angle image W(x, y) by the pixels on the deformed long-focus image T(x+u, y+v). With regard to those pixels outside the corresponding wide-angle image W(x, y) and unable to match with the pixels on the deformed long-focus image T(x+u, y+v), their visual effects can also be strengthened through performing an image enhancement process thereto.

Thus, in the present invention, although the wide-angle lens and the long-focus lens respectively installed on the wide-angle image capturing element 31 and the long-focus image capturing element 32 are fixed focus lenses, and the electronic device 30 can only perform digital zooming process to the wide-angle image W(x, y) and the long-focus image T(x+u, y+v), respectively, however, as stated in the foregoing, once when the hardware parameters of the wide-angle image capturing element 31 and the long-focus image capturing element 32 are determined, the image ratio (such as 1.8 or 2.3) between the wide-angle image W(x, y) and the long-focus image T(x+u, y+v) can easily be obtained. In the verification with respect to an embodiment of the present invention described in the subsequent paragraph, the image ratio between the wide-angle image W(x, y) and the long-focus image T(x+u, y+v) is 1.8 as an example for explanation purpose.

Figure 6A:
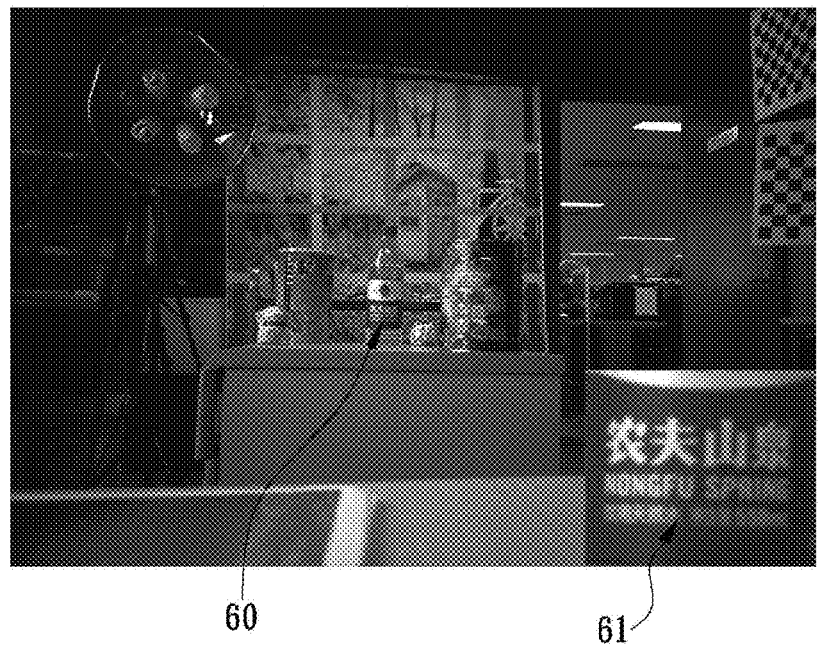
FIG. 6(a) is a wide-angle image captured by the wide-angle image capturing element.
Figure 6B:
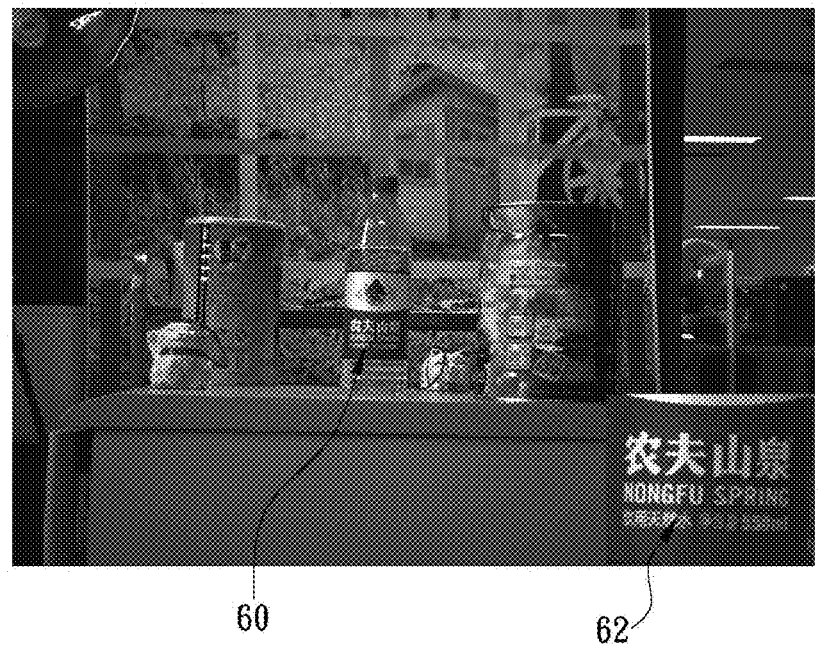
FIG. 6(b) is a long-focus image captured by the long-focus image capturing element.
Figure 6C:
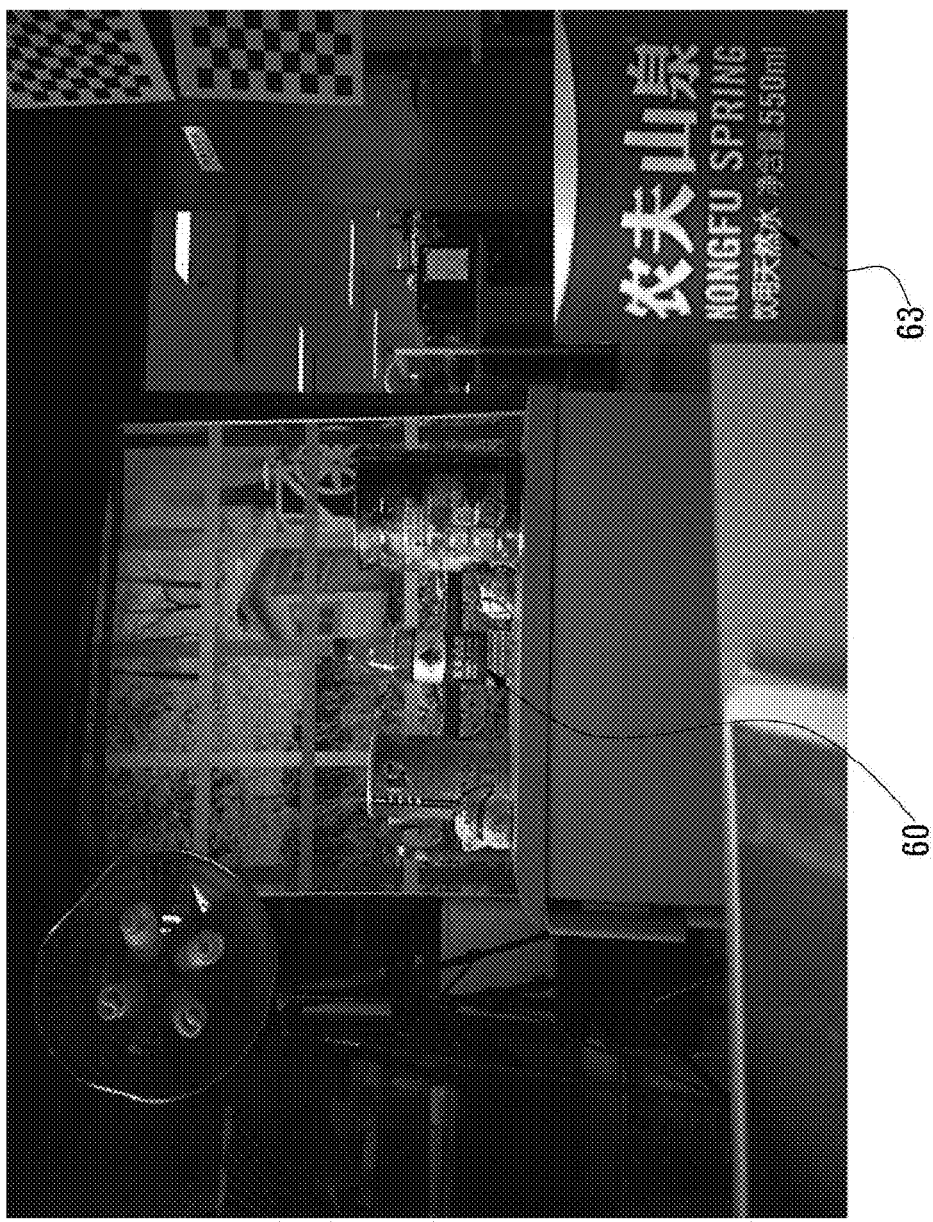
FIG. 6(c) is a new wide-angle image generated by the electronic device of the present invention after performing an image morphing fusion process respectively to the wide-angle image and the long-focus image.

Accordingly, please refer to FIG. 6, when a user operates the electronic device 30 of the present invention to perform a digital zooming process from a zoom ratio of 0 to a zoom ratio of 3.0, although the wide-angle image capturing element 31 is unable to accurately fix focus on the object 60 (i.e. the mineral water bottle as shown in FIG. 6(*a*)) while capturing the wide-angle image shown in FIG. 6(*a*) through the digital zooming process, causing the text image 61 (shown at the right bottom corner of FIG. 6(*a*)) on the object 60 becoming blurred, however, at this moment, because the long-focus image capturing element 32 is able to accurately fix focus on the object 60 (i.e. the mineral water bottle shown in FIG. 6(*b*)) so that, when the long-focus image capturing element 32 generates the long-focus image of the object 60 through the digital zooming process, the text image 62 (shown at the right bottom corner of FIG. 6(*a*)) on the body 60 remains very clear, therefore, through the method of the present invention, after performing the image morphing fusion process respectively to the wide-angle image and the long-focus image to generate a new wide-angle image of the body 60 shown in FIG. 6(*c*), it is obvious that the text image 63 (shown at the right bottom corner of FIG. 6(*c*)) on the body 60 will remain very clear, without having any ambiguity or blurred problem.

Figure 7A:
FIGS. 7(a) and 7(b) are images captured through a digital zooming by the electronic device of the present invention, wherein the object within the images does not significantly skip between the images.
Figure 7B:
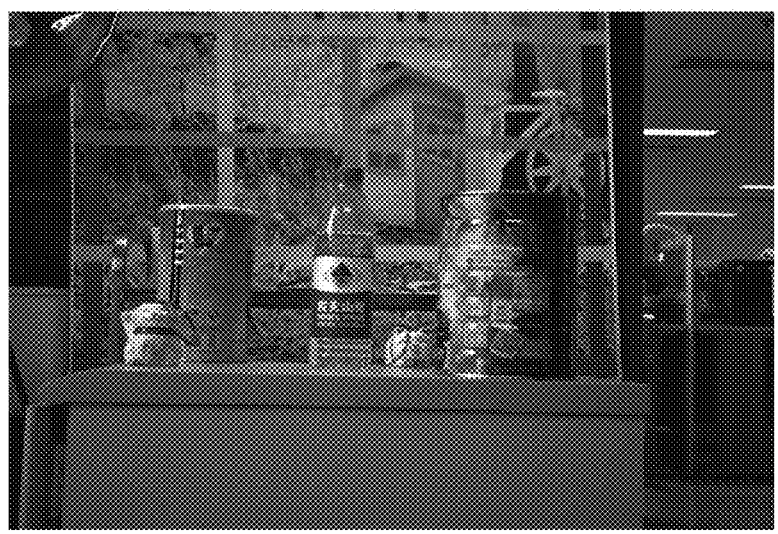

In addition, please refer to FIG. 7, when the user operates the electronic device 30 of the present invention to perform the digital zooming process, for example, from a zoom ratio of 1.79 (as shown in FIG. 7(*a*)) to a zoom ratio of 1.80 (as shown in FIG. 7(*b*)), it can easily found that there isn't any significant skipping phenomenon occurred in the object between the two images captured at zoom ratios of 1.79 and 1.80. Accordingly, it is indeed that the method of the present invention is able to let the electronic device 30 have a precise, clear and excellent optical zooming mechanism eligible to be comparable to the optical zooming function provided by the professional SLR cameras.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method of utilizing a wide-angle image capturing element and a long-focus image capturing element to achieve clear and precise optical zooming when controlling an electronic device to simultaneously and respectively capture a wide-angle image and a long-focus image of a same spot comprising the steps of:

reading the wide-angle image and the long-focus image, and performing exposure and white balance adjustment processes to the wide-angle image and the long-focus image respectively, so as to enable the exposure and the white balance of the wide-angle image and the long-focus image to be in consistency;

performing an image matching algorithm to the wide-angle image and the long-focus image respectively, so as to enable each pixel on the long-focus image to match with each corresponding pixel on the wide-angle image; wherein the image matching algorithm calculates and obtains an image ratio between the long-focus image and the wide-angle image according to hardware parameters of the long-focus image capturing element and the wide-angle image capturing element, retrieves a region from the wide-angle image that corresponds to the long-focus image according to the image ratio, and then calculates and obtain dense optical flow field of an offset of each pixel on the long-focus image with respect to each corresponding pixel on the wide-angle image by using an optical flow estimation; and performing an image morphing fusion process to the corresponding pixels on the long-focus image and the wide-angle image, so as to generate a new wide-angle image; wherein the image morphing fusion process performs an offset deformation to the pixels on the long-focus image T(x+u, y+v) according to the dense optical flow fields of the offsets (u, v) of the pixels on the long-focus images T(x+u, y+v), so as to enable the pixels on the long-focus image T(x+u, y+v) to be deformed to match with the corresponding pixels on the wide-angle image W(x, y), and then perform a fusion process to the long-focus image T(x+u, y+v) and the wide-angle image W(x, y), in accordance with the following formula, so as to generate the new wide-angle image $W_{NEW}$:

$$W_{NEW}=(1-\lambda)T(x+u,y+v)+\lambda*W(x,y)$$

wherein $\lambda$ is a weight factor and wherein, when pixels on a deformed long-focus image T(x+u, y+v) are clearer than the corresponding pixels on the wide-angle image W(x, y), taking $\lambda=0$, otherwise, taking $0<\lambda<1.0$.

2. The method according to the claim 1, wherein the optical flow estimation is performed in accordance with the following formula based on a Horn-Schunck optical flow estimation model, so as to obtain the dense optical flow field through converting an optical flow estimation into a process for obtaining the smallest error between the corresponding pixels on the deformed long-focus image T(x+u, y+v) and the wide-angle image W(x, y):

$$\min E(u,v)=\int_{\Omega}[(\varphi(W(x,y)-T(x+u,y+v))+\alpha*\psi(|\nabla u|,|\nabla v|)]dxdy$$

wherein, $\varphi(W(x, y)-T(x+u, y+v))$ is a data item representing the gray value conservation constraint for enabling each corresponding pixels on the wide-angle image W(x, y) and the long-focus images T(x+u, y+v) to be the same as far as possible, $\varphi$ is a first error function; $\alpha*\psi(|\nabla u|,|\nabla v|)$: is a smooth item representing the optical flow smoothness constraint for enabling the offset between every two adjacent pixels on the wide-angle image W(x, y) and the long-focus image T(x+u , y+v) not to be much different, $\alpha$ is a weight factor for controlling the weight between the data item and the smooth item, $\psi$ is a second error function, and $\nabla u$, $\nabla v$ are modulus lengths of the offset gradients.

3. The method according to the claim 2, wherein at least one of the first and second error functions $\varphi$ and $\psi$ is a quadratic function.

4. The method according to the claim 3, wherein the presumption of the optical. flow estimation is that brightness differences between the corresponding pixels on the long-focus image T(x+u, y+v) and the wide-angle image W(x, y) are constant.

5. The method according to the claim 4, wherein the presumption of the optical flow estimation is that motion differences between the corresponding pixels on the long-focus image T(x+u, y+v) and the wide-angle image W(x, y) are small.

6. The method according to the claim 5, wherein the presumption of the optical flow estimation is that motion vectors of the corresponding pixels on the long-focus image T(x+u, y+v) and the wide-angle image W(x, y) are the same.

* * * * *